Patented May 23, 1939

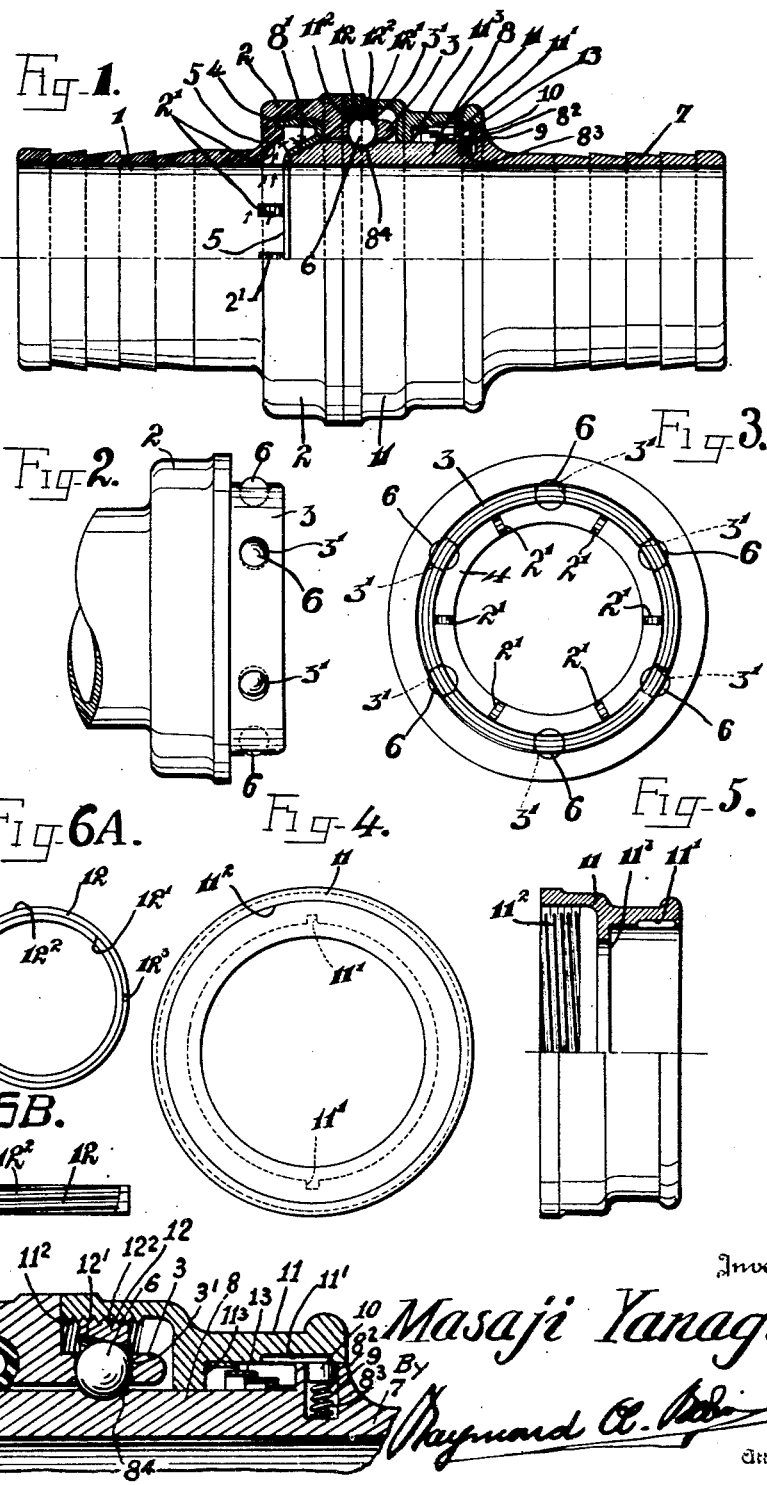

2,159,242

UNITED STATES PATENT OFFICE 2,159,242

PIPE JOINT

Masaji Yanagi, Kamata-ku, Tokyo, Japan

Application August 23, 1937, Serial No. 160,459
In Japan August 24, 1936

4 Claims. (Cl. 285—168)

My invention relates to improvements in pipe joints and particularly in those for flexible hose used in water or other fluid pressure systems.

An object of my invention is to obtain pipe joints which are used to connect a pair of pipes or hose with a positive fluid-tightness.

Another object of my invention is to obtain pipe joints of the kind specified which connect a pair of pipes, the connecting operation being effected without relative rotation of any part of the joints.

A further object of my invention is to obtain pipe joints with compensating means for wear of the joint parts.

These and other objects are effected by my invention as will be apparent from the following description and claims taken in connection with the accompanying drawing, and forming a part of this application, in which:

Fig. 1 is a view in elevation, partly in section, of a pipe joint embodying my invention.

Fig. 2 is an elevational view, partly broken away, of the female member of the pipe joint shown in Fig. 1.

Fig. 3 is an end view of the female member.

Fig. 4 is an end view of the bushing member shown in Fig. 1.

Fig. 5 is a view in elevation, partly in section, of the bushing member.

Fig. 6A is an end view of the retaining ring adjustably fixed inside the bushing member.

Fig. 6B is an elevational view of the retaining ring.

Fig. 7 is a sectional enlarged view of the pipe joint structure shown in Figure 1.

Referring to the drawing, my pipe joint shown comprises a pair of tubular metal members, i. e., a female member 1 and a male member 7.

The female member 1 is provided with an enlarged joint portion 2. The joint portion 2 has an annular recess 4 formed therein, which recess defines together with the co-operating end $8^1$, hereinafter mentioned, of the male member 7 an annular chamber, the radial section of the chamber being of somewhat U shape with its axis substantially parallel with the axis of the pipe joint. An annular gasket member 5 of flexible rubber or the like is disposed within the annular chamber, the member 5 having an appropriate formation to conform with the chamber. The annular chamber communicates with the interior of the member 1 through a plurality of grooves $2^1$ formed in member 1. The enlarged joint portion 2 is also provided with a tubular extension 3 of a reduced diameter, and a plurality of circumferentially spaced radial holes $3^1$ are provided to receive steel balls 6 respectively therein. The open ends of each hole $3^1$ are suitably deformed after a ball 6 is inserted therein, in order to prevent the ball 6 from dropping out of the hole. The balls 6, however, are free to move radially to some extent within the holes, respectively.

The male member 7 is provided at the end to co-operate with the female member a joint portion 8, the outer diameter of which is slightly less than the inner diameter of the tubular extension 3 of the female member, while the inner diameter of the portion 8 is preferably equal to those of the members 1 and 7, in order to minimize the flow resistance. The joint portion 8 has its end periphery $8^1$ bevelled so as to define the before-mentioned U-shaped annular chamber in which the annular gasket member 5 is disposed. The joint portion 8 has an annular rib $8^2$ which defines the portion 8 from the tail portion of the male member 7. The rib $8^2$ is provided with a plurality of recesses $8^3$ at diametrically opposite positions to receive plungers 10 respectively. Each plunger 10 is outwardly biased by coiled springs 9 disposed between the plunger and the bottom of the recess $8^3$. The joint portion 8 is also provided with a plurality of circumferentially spaced recesses $8^4$ into which the steel balls 6 respectively engage when in the operating position of the pipe joint.

The balls 6 are actuated to and retained in the operating position, in which they firmly engage with the recesses $8^4$ to prevent separation of the members 1 and 7 from each other, by means of a tapered cam face $12^1$ of a retaining ring 12 which is adjustably fixed to the inner side of a bushing member 11 by means of screw threads $12^2$ and $11^2$.

The bushing member 11 has at the end opposite to the annular rib $8^2$, a plurality of axial slots $11^1$ into which the outer ends of the plungers 10 respectively enter to prevent the relative rotation of the members 7 and 11 but to allow a limited axial movement of the member 11 relative to the member 7. The bushing member 11 is biased towards the female member 1 by means of a coiled spring 13 disposed between and engaging with the annular rib $8^2$ and an annular flange $11^3$ formed inside the bushing member 11, the annular end face of the member 11 abutting to a corresponding annular contact face of the joint portion 2, surrounding the tubular extension 3 of the latter. The retaining ring 12 is provided with a pair of recesses $12^3$, so as to receive the corresponding tip ends of a tool, not shown, to turn the ring 12 relative to the bushing member 11, in order to move the ring axially when parts have been worn and compensation is necessitated.

In the operating or connecting position shown of the pipe joints, a fluid under pressure predominating in the inner passage of the joint enters into the annular chamber formed by the recess 4 and the bevelled end 8¹ through the grooves 2¹ as shown by the arrows and urges the gasket member 5 to the walls of the annular chamber, thus positively preventing any leakage of the fluid around the joint portion 8 of the male member.

In order to disconnect the members 1 and 7 from each other, the bushing member 11 is first manually shifted axially out of the female member 1. By this operation, the locking balls 6 are released, and then the male member 7 is free to be removed out of the female member. In order to connect the members 1 and 7 with each other, the joint portion 8 of the member 7 is inserted into the joint portion 2 of the member 1 with the bushing member 11 manually retained towards right as viewed on Fig. 1, and then the latter is released, whereupon the spring 13 urges the bushing 11 to the connecting position shown, the retaining ring 12 actuating the locking balls 6 to the locking position shown by virtue of the bevelled cam face 12¹, and the members 1 and 7 are positively held in the connecting position.

While I have shown my invention in but one form, it will be obvious to those skilled in the art that it is not so limited, but is susceptible of various changes and modifications without departing from the spirit thereof, and I believe, therefore, that only such limitation shall be placed thereupon as are imposed by the prior art or as are specifically set forth in the appended claims.

I claim as my invention:

1. A pipe joint comprising a tubular female member, a tubular male member partly surrounded by said tubular female member, means for preventing relative rotation between said two members, a plurality of locking balls held by said female member with a limited radial movement, a plurality of recesses formed outside said male member for respectively receiving said locking balls, a bushing member partly surrounding said male member, a retaining ring inside said bushing member, with a screw thread engagement with said bushing member, and having a tapered cam face to co-operate with said locking balls, and means for biasing said bushing member to such an axial direction that said cam face actuates and retains said locking balls in engagement with said recesses.

2. A pipe joint comprising a tubular female member having an offset joint portion to form an annular recess therein, flexible sealing means inside said recess, communicating means between the recess and the inside tubular member, a tubular extension formed on the joint portion, locking balls movably secured in projecting position in said extension, a tubular male member having a co-operating joint portion adapted to contact with the sealing means, radially projecting elements on said male joint, a bushing concentrically surrounding the male joint extension, the bushing having a plurality of axial slots co-acting with the projecting elements to limit axial movement of the bushing, and means for biasing said bushing towards the female member, the bushing being adapted to urge the balls into recesses formed in the male joint portion for locking of the pipe joints together.

3. In a pipe joint, biasing means as claimed in claim 2, comprising an annular flange formed inside the bushing, an annular rib formed outwardly around the male joint portion, and a coiled spring in between said flange and rib to urge the two apart.

4. In a pipe joint as claimed in claim 2, a retaining ring threaded inside the bushing, said ring having tapered cam faces adapted to push the balls into recesses of the male joint, whereby relative movement between the male and female members is prevented.

MASAJI YANAGI.